US006611360B1

(12) United States Patent
Kataoka

(10) Patent No.: US 6,611,360 B1
(45) Date of Patent: Aug. 26, 2003

(54) IMAGE READING APPARATUS

(75) Inventor: Junnosuke Kataoka, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/288,353

(22) Filed: Apr. 8, 1999

(30) Foreign Application Priority Data

Apr. 10, 1998 (JP) .......................................... 10-098950
Mar. 8, 1999 (JP) .......................................... 11-060638

(51) Int. Cl.⁷ .............................................. H04N 1/40
(52) U.S. Cl. ...................... 358/461; 358/474; 358/496; 358/497
(58) Field of Search ................................ 358/461, 497, 358/496, 474, 505, 444, 494, 401, 408; 399/367, 267; 382/274

(56) References Cited

U.S. PATENT DOCUMENTS 5,488,485 A * 1/1996 Amemiya ................... 358/444
5,852,501 A * 12/1998 Maehara et al. ............ 358/505

* cited by examiner

*Primary Examiner*—Cheukfan Lee
(74) *Attorney, Agent, or Firm*—Morgan & Finnegan, LLP

(57) ABSTRACT

In an image reading apparatus for reading an original image, an optimum charge storage time of a line image sensor (105) in generating shading correction data and an optimum charge storage time of the sensor in reading an original image using the generated data are stored in a storage time setting unit (103) in correspondence with each of the first reading mode in which the image of an original placed on an original table (201) is read while moving the sensor and the second reading mode in which the image of an original fed by an ADF one by one is read at a predetermined position while fixing the sensor at the position. To actually read an original image in the first or second reading mode, an optimum value is selected from the plurality of stored storage times and used.

12 Claims, 4 Drawing Sheets

IMAGE READING APPARATUS

BACKGROUND OF THE INVENTION

The present invention relates to an image reading apparatus and, more particularly, to an image reading apparatus which can be suitably applied as an original image input unit of an image processing apparatus such as a scanner, a copying machine, or a facsimile apparatus.

Conventionally, an image processing apparatus such as a scanner, a copying machine, or a facsimile apparatus widely employs a so-called line sensor (line image sensor) as an image reading unit for reading an original image. This line sensor has a plurality of photoelectric conversion elements such as CCDs (Charge Coupled Devices) so as to convert reflected light obtained by irradiating an original image with light from a light source into an electrical signal.

Generally, in an image reading unit having such a line sensor, to correct variations in sensitivity among photoelectric conversion elements arrayed in a line on the line sensor, so-called shading correction processing is performed to optimize the gain in correspondence with the individual photoelectric conversion elements and the lamp characteristics of a light source.

A general shading correction operation will be briefly described with reference to an image processing apparatus or a facsimile apparatus shown in FIG. 2. To generate shading correction data, a control unit (not shown) of the image processing apparatus reads a predetermined white reference plate 202 located near an original table 201 through a line sensor 105 and generates shading correction data on the basis of an image signal output from the line sensor 105 upon reading. The shading correction data generated with this procedure is stored in the memory of the control unit and directly used when an original image is actually read to generate the input image data of the original image.

As the image reading unit of such an image processing apparatus, a unit incorporating a so-called ADF (Automatic Document Feeder) for automatically feeding a plurality of originals to the original table one by one is also popularly used. In such a image reading unit, just like a conventional image reading unit like a unit employed in a general facsimile apparatus, when a plurality of originals are to be read, the line sensor is fixed at a predetermined image read position, and the originals are fed to that position one by one. In this image reading unit, the charge storage time of photoelectric conversion elements, which is used to read the originals fed by the ADF, is the same as the charge storage time of the photoelectric conversion elements, which is used to read the image of one original directly mounted on the original table by the user while moving the line sensor. In addition, when an original image is to be read, shading correction data which has been generated in advance is generally commonly used independently of use or nonuse of the ADF.

Hence, such an image reading unit need be designed such that the density of an input image obtained by reading a reference original image using the ADF (read while fixing the line sensor at a predetermined position) equals the density of an input image obtained by reading the reference original image mounted on the original table (read while moving the line sensor).

However, it is generally difficult to design an image reading unit while equalizing the input image densities. In many cases, a large optical difference is generated between reading an original using the ADF and reading an original placed on the original table in advance by, e.g., a difference in distance between the SELFOC lens of the line sensor and the original mount surface or a difference in diffused reflection due to the structure around the reading mechanism in the unit. To correct this difference, generally, a γ correction table used to convert luminance data into density data is prepared for each of image reading using the ADF and reading an original on the original table. By preparing different data, the input image densities are corrected to be substantially equal. In this case, however, the dynamic range of gradation of the input image becomes narrow.

In addition, in the conventional image reading unit, the storage time of photoelectric conversion elements does not change between generation of shading correction data and actual read of an original image independently of the elapsed time from the start of turning on the light source, as described above.

For this reason, when a light source of a certain type with an unstable light amount, i.e., a light source whose light amount is small at the start of turning on, increases then, and gradually decreases again is employed in the image reading unit, and a plurality of originals are to be continuously read, the image cannot be read in accordance with the change in amount of light emitted from the light source. That is, the light amount of the light source in reading the first original, that in reading several originals, and that in reading the final original are different. As a result, the input images corresponding to the plurality of originals have a density difference.

SUMMARY OF THE INVENTION

The present invention has been made to solve above described problems. It is an object of the present invention to provide an image reading apparatus for generating a satisfactory input image, when an original image is read, in any reading mode of a plurality of reading modes.

In order to achieve the above object, an image reading apparatus according to the present invention is characterized by comprising the following arrangement.

An image reading apparatus for reading an original image using a line sensor having a plurality of photoelectric conversion elements, characterized by comprising:

a memory for storing a charge storage time of the photoelectric conversion elements in correspondence with each of first and second reading modes;

detection means for detecting the first or second reading mode to be used to read the original image; and image reading means for reading out a charge storage time corresponding to the reading mode detected by the detection means from the memory and reading the original image with the line sensor in accordance with the selected charge storage time.

The memory preferably stores a charge storage time for reading a reference portion and a charge storage time for reading an original image using data (shading correction data) generated upon reading the reference portion in correspondence with each of the first and second reading modes.

In the apparatus arrangement, the image reading means is of a type that reads in the first reading mode, an image of an original placed on an original table while moving the line sensor, and in the second reading mode, an image of a fed original at a predetermined position while fixing the line sensor at the predetermined position.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Embodiments in which an image reading apparatus according to the present invention is applied to a facsimile apparatus as an image reading unit will be described below in detail with reference to the accompanying drawings.

[First Embodiment]

Figure 1:
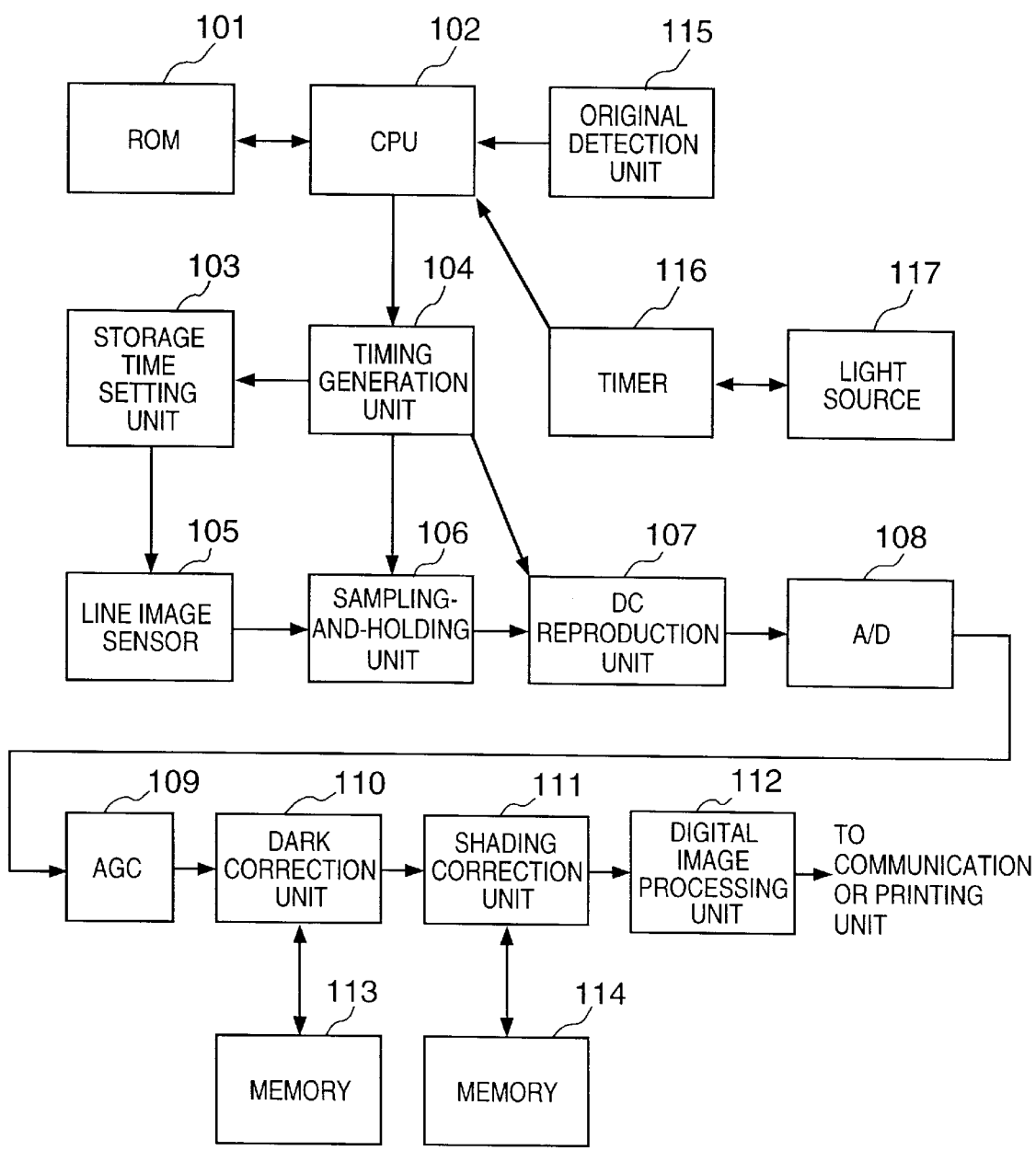
FIG. 1 is a block diagram showing the arrangement of an image reading apparatus according to the first embodiment of the present invention.
Figure 2:
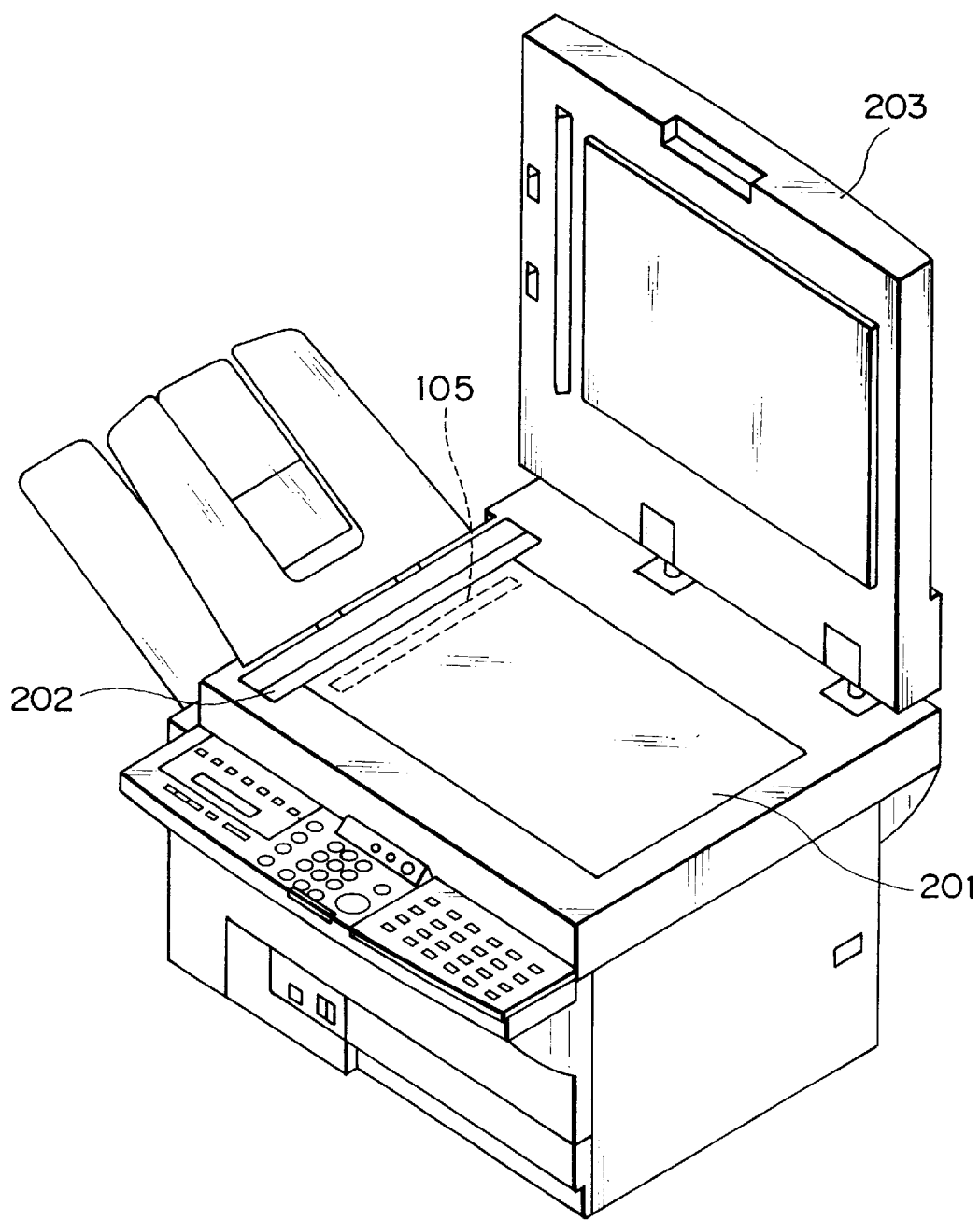
FIG. 2 is a perspective view showing the outer appearance of a facsimile apparatus to which the present invention can be applied.

FIG. 1 is a block diagram showing the arrangement of an image reading apparatus according to the first embodiment of the present invention. FIG. 2 is a perspective view showing the outer appearance of a facsimile apparatus to which the present invention can be applied. The original read operation of the image reading apparatus according to this embodiment can be roughly divided into prescanning before original reading (scanning), in which shading correction data is generated, and scanning in which an original is read. In this embodiment, prescanning is performed only once before scanning. For this reason, the same shading correction data as that generated by prescanning is used even when a plurality of originals are to be read by scanning.

Referring to FIG. 1, a ROM 101 stores programs for communication processing, image read processing (to be described later), and the like in advance. As the ROM 101, not only a general semiconductor memory but also a system comprising a storage medium such as an optical disk, a magnetooptical disk, or a magnetic medium and a reader for reading program codes from the storage medium can be used.

A CPU 102 controls the entire operation of the facsimile apparatus in accordance with the program stored in the ROM 101. A storage time setting unit 103 sets, in a line image sensor 105, a predetermined charge storage time (to be referred to as a storage time hereinafter) in which photoelectric conversion elements in the sensor store charges (details will be described later).

A timing generation unit 104 generates a predetermined operation timing signal on the basis of a control signal from the CPU 102 and supplies the generated timing signal to blocks shown in FIG. 1. The line image sensor 105 has a plurality of photoelectric conversion elements such as CCDs and converts reflected light from an original into an electrical signal corresponding to the amount of the reflected light.

A sampling-and-holding unit 106 samples an analog image signal output from the line image sensor 105 in accordance with the timing signal from the timing generation unit 104. A DC reproduction unit 107 amplifies the analog image signal output from the sampling-and-holding unit 106 in accordance with a predetermined input range of an analog/digital converter 108 connected to the output side of the DC reproduction unit 107.

The general analog/digital (A/D) converter 108 converts the analog image signal output from the DC reproduction unit 107 into digital image data. A general automatic gain control (AGC) unit 109 adjusts the gain of the image data output from the A/D converter 108.

A general dark correction unit 110 subtracts dark correction data stored in a memory 113 by processing to be described later from the image data output from the AGC unit 109, thereby substantially normalizing the luminance level to zero. A general shading correction unit 111 performs gain adjustment of the image data output from the dark correction unit 110 in accordance with the individual photoelectric conversion elements and the lamp characteristics of the light source on the basis of the shading correction data stored in a memory 114 by processing to be described later.

A digital image processing unit 112 performs general image processing for the image output from the shading correction unit 111 for the purpose of communication or printing in a communication unit or printing unit (not illustrated in FIG. 1).

A detection unit 115 detects whether the original to be read is present on the original table when a switch for starting transmission or copy of the original is operated, and notifies the CPU 102 of the detection result. A timer 116 counts the ON time of a light source 117 when the above switch is operated to turn on the light source. The light source 117 irradiates, with light, an original image in reading an original or a white reference plate 202 shown in FIG. 2 in prescanning.

Referring to FIG. 2, an original is put on an original table 201 with its image bearing surface facing down. The white reference plate 202 is read by prescanning to generate shading correction data before the original image is read (scanned). An original press plate 203 incorporates an ADF (Automatic Document Feeder). When a plurality of originals are to be automatically fed by the ADF, the original press plate 203 is closed to cover the original table 201. In the line image sensor 105, a fluorescent tube (not shown) corresponding to the light source 117 in FIG. 1 is fixed parallel to the arrangement direction of the plurality of photoelectric conversion elements in the sensor. In the first reading mode in which an original directly placed on the original table 201 by the user is read with the line image sensor 105, the original image is read while moving the line image sensor 105 under the original table 201 to the left and right sides by a mechanism (not shown). In the second reading mode in which a plurality of originals are read using the ADF, the line image sensor 105 is fixed at a predetermined image read portion, and the images of the originals fed by the ADF one by one are read at that position.

Original image read processing performed by the storage time setting unit 103 in the above apparatus arrangement will be described.

Figure 3:
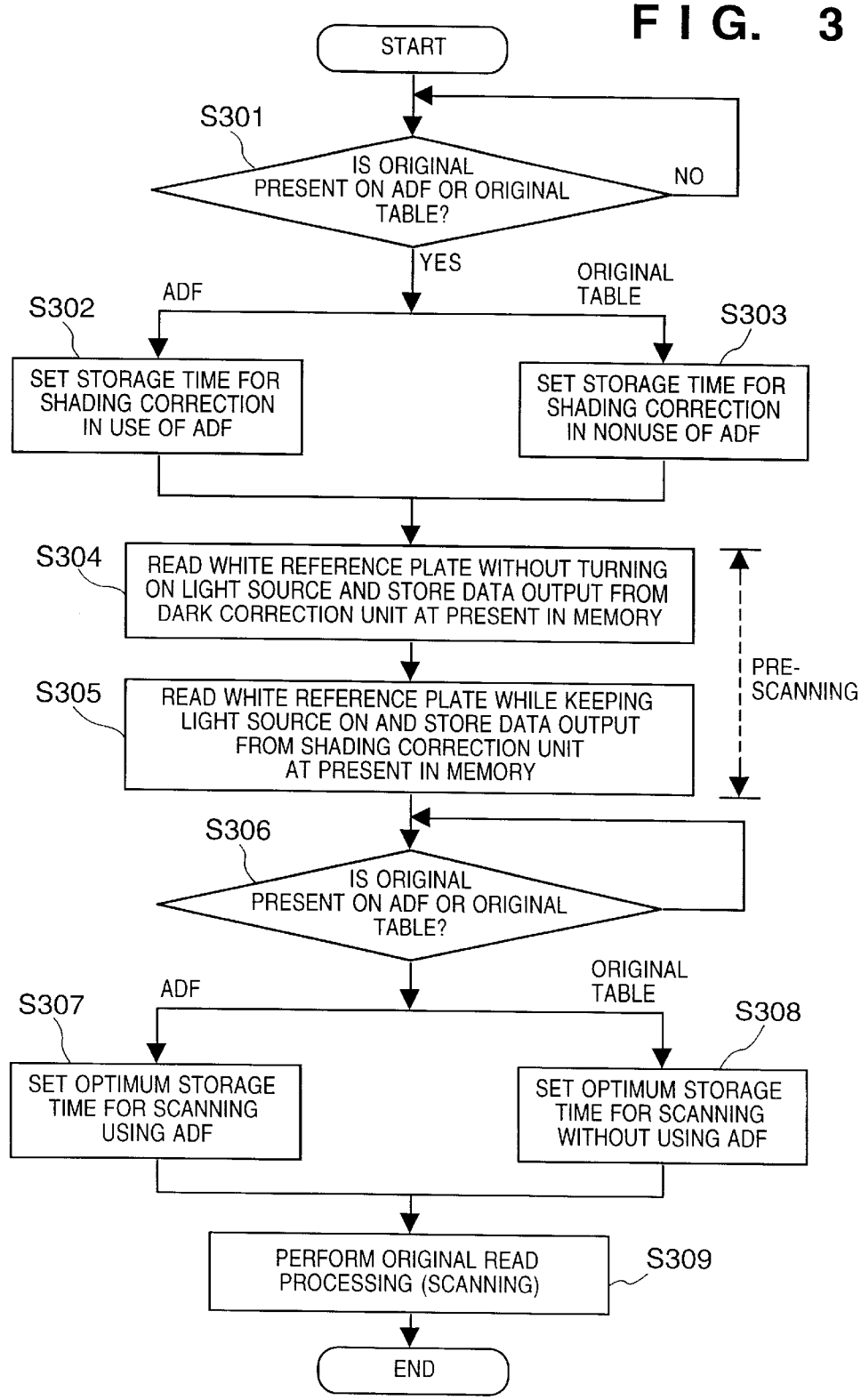
FIG. 3 is a flow chart showing original read processing in the first embodiment of the present invention.

FIG. 3 is a flow chart showing original read processing in the first embodiment of the present invention. This processing is started when a predetermined switch for starting transmission or copy of an original is operated on the front panel of the facsimile apparatus shown in FIG. 2.

Step S301 in FIG. 3: The presence/absence of an original on the ADF and original table 201 is detected on the basis of the output signal from the original detection unit 115. When an original to be read is present on the ADF, the flow advances to step S302. When an original is present on the original table 201, the flow advances to step S303.

Step S302: If it is determined in step S301 that an original to be read is placed on the ADF, a storage time for scanning using the ADF is selected from predetermined storage times of photoelectric conversion elements for shading correction by prescanning, i.e., data stored in the storage time setting unit 103 in advance, and the readout storage time is set in the line image sensor 105.

Step 303: If it is determined in step S301 that an original to be read is placed on the original table 201, a storage time for scanning without using the ADF is selected from predetermined storage times of photoelectric conversion elements for shading correction by prescanning, i.e., data stored in the storage time setting unit 103 in advance, and the readout storage time is set in the line image sensor 105.

Step S304: The line image sensor 105 is moved to a predetermined position under the white reference plate 202. The white reference plate 202 is read with the line image sensor 105 while keeping the light source 117 OFF. An image signal output from the sensor at this time is subjected to predetermined processing operations in the above-described sampling-and-holding unit 106, DC reproduction unit 107, A/D conversion unit 108, and AGC unit 109. Image data output from the AGC unit 109 is stored in the memory 113 as dark correction data.

A supplementary explanation will be given below as to the operation of the dark correction unit 110. In dark correction data generation in step S304, the dark correction unit 110 stores image data output from the AGC unit 109 in the memory 113 as dark correction data. In shading correction data generation in step S305 and in original reading in step S309 (scanning) (both steps will be described later), the dark correction unit 110 outputs a value (image data) obtained by subtracting the dark correction data stored in the memory 113 in step S304 from the image data output from the AGC unit 109. These operations are switched by the CPU 102.

Step S305: While the line image sensor 105 is kept located at the predetermined position under the white reference plate 202 in step S304, the light source 117 is turned on. The white reference plate 202 is read with the line image sensor 105. An image signal output from the sensor at this time is subjected to predetermined processing operations in the above-described sampling-and-holding unit 106, DC reproduction unit 107, A/D conversion unit 108, AGC unit 109, dark correction unit 110, and shading correction unit 111. Image data output from the shading correction unit 111 is stored in the memory 114 as shading correction data.

A supplementary explanation will be given below as to the operation of the shading correction unit 111. In shading correction data generation in step S305, the shading correction unit 111 stores image data output from the dark correction unit 110 in the memory 114 as shading correction data. In original reading in step S309 (scanning) to be described later, the shading correction unit 111 divides the image data output from the dark correction unit 110 by the shading correction data stored in the memory 114 in step S305. With this processing, a value with a substantially highest luminance level contained in the image data is normalized to the maximum value of the image data (for example, 256 when the A/D converter 108 processes 8-bit data). These operations are switched by the CPU 102.

With prescanning in steps S304 and S305, optimum dark correction data and shading correction data for the second reading mode in which the ADF is used for scanning, or optimum dark correction data and shading correction data for the first reading mode in which the ADF is not used for scanning are prepared in the memories 113 and 114, respectively. In the subsequent steps, an optimum storage time to be set in the line image sensor 105 for scanning after prescanning is read out from the storage time setting unit 103 in accordance with whether the ADF is used or not used for scanning, and the readout storage time is set in the sensor.

Step S306: The presence/absence of an original on the ADF and original table 201 is detected on the basis of the output signal from the original detection unit 115, as in step S301. When an original to be read is present on the ADF, the flow advances to step S307. When an original is present on the original table 201, the flow advances to step S308.

Step S307: If it is determined in step S306 that an original to be read is set on the ADF, a storage time for scanning using the ADF is selected from predetermined storage times of photoelectric conversion elements for scanning, i.e., data stored in the storage time setting unit 103 in advance, and the readout storage time is set in the line image sensor 105.

Step S308: If it is determined in step S306 that an original to be read is set on the original table 201, a storage time for scanning the original mounted on the original table 201 without using the ADF is selected from predetermined storage times of photoelectric conversion elements for scanning, i.e., data stored in the storage time setting unit 103 in advance, and the readout storage time is set in the line image sensor 105.

With processing in step S307 or S308, an optimum storage time for scanning is set in the line image sensor 105. Next, the original is scanned.

In step S309, while keeping the light source 117 ON, the line image sensor 105 is moved to a predetermined original read start position on a slightly right side of the position beneath the white reference plate 202. Reflected light from the original set at the position is read with the sensor while sequentially moving the sensor from the position to the right side. The analog image signal output from the sensor is subjected to predetermined processing operations in the above-described sampling-and-holding unit 106, DC reproduction unit 107, A/D conversion unit 108, AGC unit 109, dark correction unit 110, shading correction unit 111, and digital image processing unit 112, thereby obtaining input image data (original image data) of one original. When the original to be read is set on the ADF, prior to original scanning, while keeping the light source 117 ON, the line image sensor 105 is moved to a predetermined original read position on a slightly right side of the position under the white reference plate 202 and fixed at the original read position, and the image of the first original fed to the original read position by the ADF is read. When scanning of the first original is ended, the original must be returned to a predetermined original set position on the ADF, and simultaneously, feed of the second original must be started. This original feed operation is repeated until reading (scanning) of the final original is ended.

A method of determining data to be stored in the storage time setting unit 103 in advance and set in the line image sensor 105 for prescanning and scanning will be described next.

In this embodiment, the storage times stored in the storage time setting unit 103 are empirical values experimentally obtained in advance. More specifically, the values are obtained on the basis of the light amount of the light source 117 used, the density of the white reference plate 202, the photoelectric conversion performance of photoelectric conversion elements in the line image sensor 105, and the input voltage of the A/D converter 108.

A description will be made below while exemplifying a case wherein the input range of the A/D converter 108 is −ref=0 V to +ref=2V, and the output signal (digital multi-valued data) from the A/D converter 108 corresponding to the input range can maintain linearity with respect to the input signal within the range of 200 mV to 1,800 mV.

First, a method of determining the optimum storage time when the original to be read is directly placed on the original table 201, i.e., when the original image is to be read by scanning without using the ADF will be described.

In this case, an original with a completely white surface as a reference is placed on the original table 201, and this white original is read with the line image sensor 105. The storage time is determined such that the peak value of the analog signal output from the photoelectric conversion lements in the sensor at this time becomes smaller than the upper limit value (+ref=2 V) of the input range of the A/D converter 108 by about 5%, i.e., 1,710 mV. When the storage time is determined to satisfy this condition, the linearity of the output signal from the A/D converter with respect to the input signal can be maintained.

The above reference white original is not an actual white original whose density is supposed to be the lowest in all originals that may be handled by normal users but an original which is supposed by the designer to be preferable as a completely white (pure white) image as the input image (value of digital image data) in the image reading apparatus by scanning. The reason for this is as follows. Assume that an original image is printed on a paper sheet such as a regenerated paper sheet with a relatively dark base. In this case, even at a print portion recognized as a completely white portion, the input image obtained in the apparatus by reading the original image contains data representing density, though the quantity of data is very small. In this case, when the input image is binarized into a pseudo halftone image by, e.g., error diffusion in the apparatus, not a completely white image but an image in which white and black portions are mixed is printed. Hence, when an image has a certain luminance or more, a satisfactory result can be obtained by processing the image in the apparatus as a completely white image.

A method of determining the optimum storage time when the original to be read is directly set on the original table 201, and shading correction data is to be generated by prescanning before scanning will be described.

In this case, the white reference plate 202 is read with the line image sensor 105. The storage time is determined such that the peak value of the analog signal output from the photoelectric conversion elements in the sensor at this time becomes smaller than the upper limit value (+ref=2 V) of the input range of the A/D converter 108 by about 5%, i.e., 1,710 mV. When the storage time is determined to satisfy this condition, the linearity of the output signal from the A/D converter with respect to the input signal can be maintained.

The white reference plate 202 is preferably an original in all originals that may be handled by normal users, that is supposed by the designer to be preferable as a completely white (pure white) image as the input image (value of digital image data) in the image reading apparatus by scanning. However, the density of the actual white reference plate can hardly be matched with such a value. In addition, the white reference plate is generally thin and slightly passes light, and therefore, is largely influenced by the density of an object (bonding position of the white reference plate in the apparatus) to which the white reference plate is bonded. For this reason, as the white reference plate, a member having a density slightly lower (and a relatively high luminance) than that supposed by the designer to be preferable as a completely white image is used. The storage time itself can easily be adjusted as needed. Hence, the storage time is set to be shorter by the time corresponding to the decrease in density of the employed white reference plate and adjusted such that the peak value of the output signal obtained by reading the selected white reference plate with the line image sensor 105 becomes 1,710 mV. Conversely, when a member having a density higher than that supposed by the designer to be preferable as a completely white image is employed as the white reference plate, the storage time is set to be longer by the time corresponding to the increase in density of the white reference plate.

When the storage time for scanning when the original to be read is directly set on the original table and the storage time for prescanning (shading correction data generation) before scanning are determined by these methods, the dynamic range of the density of the original can be efficiently matched with that of the AID converter, and a satisfactory S/N ratio can be realized.

The storage time for scanning when the original is to be read using the ADF and the storage time for prescanning (shading correction data generation) before scanning can also be determined in accordance with the same procedure as described above.

As described above, according to this embodiment, both when the original image is read while moving the line sensor and when the original is read while fixing the line sensor in position, a satisfactory input image can be generated. That is, for both prescanning and scanning, an optimum storage time that changes depending on whether the ADF is used or not used for scanning can be automatically set. For this reason, the decrease in dynamic range of gradation of an input image, which occurs upon correcting the image density using a γ correction table as in the prior art, can be prevented. In addition, the reading mechanism can easily be designed in a short time as compared to the prior art, and the cost of products can be reduced.

Further, according to this embodiment, since optimum storage times can be used for scanning using the ADF and scanning without using the ADF, respectively, different γ correction tables need not prepared, unlike the prior art. Hence, a common γ correction table can be used for scanning using the ADF and scanning without using the ADF, so the design cost can be reduced.

[Second Embodiment]

In this embodiment, a case wherein the arrangement of the image reading apparatus of the above-described first embodiment (FIG. 1) is employed, and the storage time of photoelectric conversion elements is set by another method will be described. A detailed description of the same parts as in the first embodiment will be omitted, and only the characteristic portions of the second embodiment will be described.

In this embodiment, a case wherein the light amount of a light source 117 is not constant but changes over time after it is turned on will be considered. In this embodiment, when a plurality of originals are read by scanning, a new storage time is set every time one original is read. More specifically, the change over time in light amount of the light source 117 after ON operation is predicted in advance. Next, a storage time as a reference (to be referred to as a reference storage time hereinafter) is determined for each of the second reading mode using the ADF and the first reading mode without using the ADF. The determined storage time and a characteristic curve representing the change over time in the measured light amount or a coefficient (correction coefficient) representing the change over time are stored in a storage time setting unit 103. When a plurality of originals are to be read by scanning, an optimum storage time is calculated on the basis of the reference storage time and characteristic curve or correction coefficient which are stored in the storage time setting unit 103 in advance every time one original is read, and the calculated storage time is set in a line image sensor 105.

Figure 4:
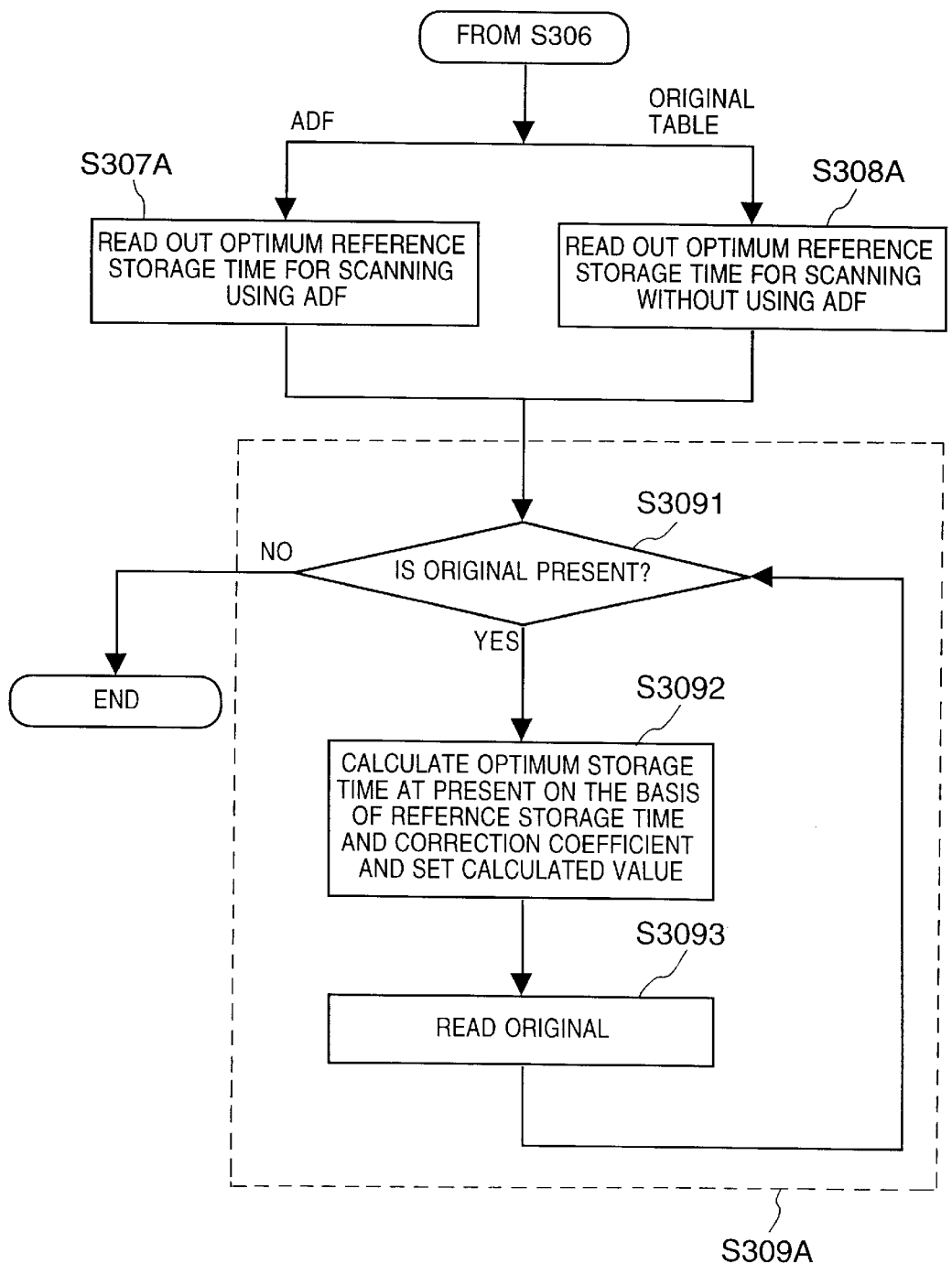
FIG. 4 is a flow chart showing part of original read processing in the second embodiment of the present invention.

FIG. 4 is a flow chart showing part of original read processing in the second embodiment of the present invention. FIG. 4 shows portions different from the first embodiment.

Step S307A or S308 in FIG. 4: When it is determined in step S306 that the original to be read is present on the ADF, a storage time for scanning using the ADF is selected from predetermined storage times of photoelectric conversion elements for scanning, i.e., data stored in the storage time setting unit 103 in advance (step S307A). In step S308A, a reference storage time for scanning without using the ADF is read out.

Step S309A is the routine of original read processing in this embodiment.

Step S3091: It is determined on the basis of the output signal from an original detection unit 115 whether an original to be read is still present. If YES in step S3091, the flow advances to step S3092. If NO in step S3091, original read processing is ended.

Step S3092: A correction coefficient corresponding to a time closest to the elapsed time from the start of turning on the light source 117, which is counted by a timer 116, is selected from correction coefficients stored in the storage time setting unit 103 in advance. The optimum storage time at present is calculated on the basis of the correction coefficient and the reference storage time read in step S307A or S308A. The calculated value is set in the line image sensor 105. More specifically, assume that the reference storage time for scanning using the ADF is 0.95 ms, the change in light amount after the start of turning on the light source 117 is 90% immediately after turning on, 95% after 5 sec 100% after 10 sec, and 95% after 15 sec. When reading the second original is started about 6 sec after the start of turning on the light source 117, the product of the storage time after 5 sec, 0.95 ms, and 100/95 is calculated, and 1 ms is set as an optimum storage time for reading the second original.

Step S3093: The original is read in accordance with the set storage time, and the flow returns to step S3091.

As described above, according to this embodiment, both in the first reading mode in which an original image is read while moving the line sensor and in the second reading mode in which an original image is read while keeping the line sensor fixed in position, a satisfactory input image can be generated, as in the first embodiment. In addition, when the light amount of the light source 117 changes over time, and a plurality of originals are to be read, the plurality of originals can be read with an almost uniform quality (density).

In the above-described second embodiment, when a plurality of originals are to be read by scanning, an optimum storage time is set for every original. However, the present invention is not limited to this arrangement. For example, the storage time for shading correction data generation by prescanning may also be calculated on the basis of the reference storage time and correction coefficient which are stored in advance.

In the above-described second embodiment, a new optimum storage time is set every time an original of one page is read by scanning. However, the present invention is not limited to this arrangement. For example, the optimum storage times at each timing immediately after turning on the light source 117, 5 sec after turning on, 10 sec after turning on, and 15 sec after turning on are determined in advance in accordance with the same procedure as in the above-described first embodiment, and one of the determined storage times is selected in accordance with the continuous ON time of the light source 117. In this case, the amount of data to be stored in the storage time setting unit 103 in advance becomes large. However, since the optimum storage time need not be calculated for every original, the processing time can be shortened.

In the above-described embodiments, an optimum one of a plurality of storage times stored in the storage time setting unit 103 in advance is used. However, the present invention is not limited to this arrangement. Even when the amplification gain of the AGC unit 109 is changed to an optimum value according to the read operation instead of storing the storage times, a satisfactory input image can be obtained, as in the first and second embodiments.

As many apparently widely different embodiments of the present invention can be made without departing from the spirit and scope thereof, it is to be understood that the invention is not limited to the specific embodiments thereof except as defined in the appended claims.

What is claimed is:

1. An image reading apparatus for reading an original image using a line sensor having a plurality of photoelectric conversion elements, comprising:

a memory for storing a charge storage time of the photoelectric conversion elements in correspondence with each of first and second reading modes, wherein the first and second reading modes correspond to first and second original image sources, respectively;

a first unit adapted to detect the first or second reading mode to be used to read the original image; and a second unit adapted to read out a charge storage time corresponding to the reading mode detected by said first unit from said memory and reading the original image with the line sensor in accordance with the selected charge storage time.

2. The image reading apparatus according to claim 1, wherein the first original image source is a user that directly places the original image on an original table.

3. The image reading apparatus according to claim 1, wherein the second original image source is an automatic document feeder (ADF).

4. An image reading apparatus for reading an original image using a line sensor having a plurality of photoelectric conversion elements, comprising:

a memory for storing a charge storage time of the photoelectric conversion elements in correspondence with each of first and second reading modes, wherein the first and second reading modes correspond to first and second original image sources, respectively;

a first unit adapted to detect the first or second reading mode to be used to read the original image; and a second unit adapted to read out a charge storage time corresponding to the reading mode detected by said first unit from said memory and reading the original image with the line sensor in accordance with the selected charge storage time;

wherein said memory stores a charge storage time for reading a reference portion and a charge storage time for reading an original image using data generated upon reading the reference portion in correspondence with each of the first and second reading modes.

5. The apparatus according to claim 4, wherein said second unit generates shading correction data upon reading the reference portion.

6. An image reading apparatus for reading an original image using a line sensor having a plurality of photoelectric conversion elements, comprising:

a memory for storing a charge storage time of the photoelectric conversion elements in correspondence with each of first and second reading modes, wherein the first and second reading modes correspond to first and second original image sources, respectively;

a first unit adapted to detect the first or second reading mode to be used to read the original image; and a second unit adapted to read out a charge storage time corresponding to the reading mode detected by said first unit from said memory and reading the original image with the line sensor in accordance with the selected charge storage time;

wherein said second unit reads in the first reading mode, an image of an original placed on an original table while moving the line sensor, and in the second reading mode, an image of a fed original at a predetermined position while fixing the line sensor at the predetermined position.

7. The apparatus according to claim 6, wherein the apparatus further comprises an automatic feeding unit for feeding a plurality of originals one by one, and in the second reading mode, the original is fed by said automatic feeding unit.

8. An image reading apparatus for reading an original image using a line sensor having a plurality of photoelectric conversion elements, comprising:

a memory for storing a charge storage time of the photoelectric conversion elements in correspondence with each of first and second reading modes, wherein the first and second reading modes correspond to first and second original image sources, respectively;

a first unit adapted to detect the first or second reading mode to be used to read the original image; and a second unit adapted to read out a charge storage time corresponding to the reading mode detected by said first unit from said memory and reading the original image with the line sensor in accordance with the selected charge storage time;

wherein said memory also stores a reference charge storage time and correction information representing a change over time in light amount after turning on a light source for irradiating an original with light, and to read image of a plurality of originals, every time one original image is read, said second unit calculates an optimum charge storage time at present on the basis of the reference charge storage time and correction information which are stored in said memory, and reads the original image with the line sensor in accordance with the calculated charge storage time.

9. The apparatus according to claim 8, wherein the apparatus further comprises an automatic feeding unit for feeding a plurality of originals one by one, and every time one original is fed by said automatic feeding unit in the second reading mode, said second unit calculates an optimum charge storage time at present and reads the original image with the line sensor in accordance with the calculated charge storage time.

10. An image reading apparatus for reading an original image using a line sensor having a plurality of photoelectric conversion elements, comprising:

a memory for storing a charge storage time of the photoelectric conversion elements in correspondence with each of first and second reading modes, wherein the first and second reading modes correspond to first and second original image sources, respectively;

a first unit adapted to detect the first or second reading mode to be used to read the original image; and a second unit adapted to read out a charge storage time corresponding to the reading mode detected by said first unit from said memory and reading the original image with the line sensor in accordance with the selected charge storage time;

wherein said memory also stores optimum charge storage times according to a change over time in light amount after turning on a light source for irradiating an original with light, and to read images of a plurality of originals, every time one original image is read, said second unit selects an optimum charge storage time at present from the charge storage times stored in said memory and reads the original image with the line sensor in accordance with the selected charge storage time.

11. The apparatus according to claim 10, wherein the apparatus further comprises an automatic feeding unit for feeding a plurality of originals one by one, and every time one original is fed by said automatic feeding unit in the second reading mode, said second unit selects an optimum charge storage time at present and reads the original image with the line sensor in accordance with the selected charge storage time.

12. An image reading apparatus for reading an original image using a line sensor having a plurality of photoelectric conversion elements, comprising:

a memory for storing a charge storage time of the photoelectric conversion elements in correspondence with each of first and second reading modes, wherein the first and second reading modes correspond to first and second original image sources, respectively;

a first unit adapted to detect the first or second reading mode to be used to read the original image; and a second unit adapted to read out a charge storage time corresponding to the reading mode detected by said first unit from said memory and reading the original image with the line sensor in accordance with the selected charge storage time;

wherein the optimum charge storage time of the photoelectric conversion elements corresponds to a time that satisfies a condition that when a predetermined reference white base is read with the line sensor, an output from a converter which converts an output signal from the photoelectric conversion elements into a digital signal can maintain linearity with respect to a predetermined input range.

* * * * *

UNITED STATES PATENT AND TRADEMARK OFFICE
CERTIFICATE OF CORRECTION

PATENT NO.    : 6,611,360 B1
DATED         : August 26, 2003
INVENTOR(S)   : Junnosuke Kataoka It is certified that error appears in the above-identified patent and that said Letters Patent is hereby corrected as shown below:

<u>Column 9,</u>
Line 38, "5 sec 100%" should read -- 5 sec, 100% --

Signed and Sealed this

Second Day of March, 2004

JON W. DUDAS
*Acting Director of the United States Patent and Trademark Office*